United States Patent
Ludu et al.

(10) Patent No.: US 6,892,682 B2
(45) Date of Patent: May 17, 2005

(54) TWO-STROKE INTERNAL COMBUSTION ENGINE WITH INTERNAL SCAVENGING

(75) Inventors: Andrei Ludu, Graz (AT); Gerhard Regner, Niklasdorf (AT)

(73) Assignee: AVL List GmbH, Graz (AT)

( * ) Notice: Subject to any disclaimer, the term of this patent is extended or adjusted under 35 U.S.C. 154(b) by 32 days.

(21) Appl. No.: 10/465,814

(22) Filed: Jun. 20, 2003

(65) Prior Publication Data

US 2004/0103863 A1 Jun. 3, 2004

(30) Foreign Application Priority Data

Jun. 27, 2002 (AT) .................................... GM413/2002

(51) Int. Cl.⁷ ............................................. F02B 25/02
(52) U.S. Cl. ................. 123/65 P; 123/65 VC; 123/568.11
(58) Field of Search .................. 123/65 A, 65 BA, 123/65 VB, 65 VC, 65 P, 568.11–568.12, 568.17

(56) References Cited

U.S. PATENT DOCUMENTS

| | | | | |
|---|---|---|---|---|
| 1,092,042 A | * | 3/1914 | Hagar | ...................... 123/73 A |
| 1,833,802 A | * | 11/1931 | Violet | ......................... 123/1 R |
| 2,043,296 A | * | 6/1936 | Luchsinger | ................ 123/65 V |
| 5,611,302 A | * | 3/1997 | Duvinage et al. | ........ 123/65 VC |
| 5,813,373 A | * | 9/1998 | Schlossarczyk et al. | ... 123/65 P |
| 6,516,787 B1 | * | 2/2003 | Dutart et al. | ................ 123/539 |

FOREIGN PATENT DOCUMENTS

| | | |
|---|---|---|
| JP | 60022061 | 2/1985 |
| JP | 03213616 | 9/1991 |
| JP | 06257520 | 9/1994 |

* cited by examiner

Primary Examiner—Marguerite McMahon
(74) Attorney, Agent, or Firm—Dykema Gossett PLLC

(57) ABSTRACT

The invention relates to a two-stroke internal combustion engine with longitudinal scavenging, with at least one piston reciprocating in a cylinder, with at least one exhaust valve disposed in the cylinder head floor and with at least one intake slot per cylinder which can be passed by a control edge of the piston, with at least one exhaust gas recirculation conduit for the recirculation of exhaust gas into the combustion chamber and at least one exhaust gas recirculation valve for controlling the recirculated exhaust gas quantity. In order to enable exhaust gas recirculation in the simplest possible way, it is provided that the exhaust gas recirculation conduit starts out directly from the combustion chamber and the exhaust gas recirculation valve is arranged as a stroke valve which is disposed in the region of the entrance of the exhaust gas recirculation conduit into the cylinder head floor.

14 Claims, 3 Drawing Sheets

TWO-STROKE INTERNAL COMBUSTION ENGINE WITH INTERNAL SCAVENGING

BACKGROUND OF THE INVENTION

The invention relates to a two-stroke internal combustion engine with longitudinal scavenging, with at least one piston reciprocating in a cylinder, with at least one exhaust valve disposed in the cylinder head floor and with at least one intake slot per cylinder which can be moved over by a control edge of the piston, with at least one exhaust gas recirculation conduit for the recirculation of exhaust gas into the combustion chamber and at least one exhaust gas recirculation valve for controlling the recirculated exhaust gas quantity.

DESCRIPTION OF THE PRIOR ART

A two-stroke internal combustion engine with longitudinal scavenging and exhaust gas recirculation is known from JP 06-257520 A. The exhaust gas recirculation branches off from the exhaust port and opens into an intake collector enclosing the cylinder in the region of the intake slots. In order to control the exhaust gas recirculation, an exhaust gas recirculation valve is provided in the exhaust gas recirculation conduit.

It is known to reduce the $NO_x$ emissions through the recirculation of exhaust gas. In longitudinally scavenged two-stroke large diesel engines an exhaust gas recirculation can only be provided with a certain amount of effort because the mean scavenging pressures are continually higher than the mean exhaust gas counter-pressures. In large engines the recirculation of exhaust gas as known from JP 06-257520 A into an intake collector is thus only possible by making additional efforts. A further disadvantage of the systems as known from the Japanese prior publication is that the exhaust gas recirculation can only be performed during the opening of the exhaust valve.

From JP 03-213616 A a two-stroke internal combustion engine with longitudinal scavenging is known in which exhaust gas is taken from the cylinder chamber by means of a stroke valve and is supplied to the cylinder chamber again via separate EGR control slots which are controlled by the piston. The exhaust gas recirculation conduit opens into an EGR ring chamber which encompasses the EGR control slots, which EGR ring chamber is separated from the scavenging chamber. This arrangement is very complex from a constructional viewpoint.

SUMMARY OF THE INVENTION

It is the object of the present invention to avoid the aforementioned disadvantages and to increase in an internal combustion engine of the kind mentioned above the exhaust gas recirculation rate in the simplest possible way.

This is achieved in accordance with the invention in such a way that the exhaust gas recirculation conduit starts out directly from the combustion chamber and that the exhaust gas recirculation valve is arranged as a stroke valve which is arranged in the region of the entrance of the exhaust gas recirculation conduit into the cylinder head floor. It is preferably provided that the exhaust gas recirculation conduit opens into the combustion chamber through at last one control slot which is controlled by the piston and is formed by the intake slot. Because the exhaust gas recirculation is controlled through a separate stroke valve, an exhaust gas recirculation is enabled which is independent of the exhaust control times. It is preferably provided that the exhaust gas recirculation valve can be opened by an actuating device approximately simultaneously with the exhaust valve or earlier than the exhaust valve and preferably can be closed before, simultaneously with or directly after the release of the intake slot. In this way it is possible to perform exhaust gas recirculation even in the case of scavenging pressures which are higher than the mean exhaust gas counter-pressures. This is of especial importance for large engines. The closing of the exhaust gas recirculation valve occurs before, simultaneously with or after the opening of the intake slot, with a short overlapping being possible. During a cycle it is also possible that the exhaust gas recirculation valve is opened several times.

It is especially advantageous when in the region of the opening of the exhaust gas recirculation conduit a guide device is arranged which divides the recirculated exhaust gas among several intake slots. As a result, a spreading and better distribution of the recirculated exhaust gases and higher exhaust gas recirculation rates are achieved and a return flow of the recirculated exhaust gases into the intake collector is prevented.

The exhaust gas recirculation conduit preferably extends in the direction of the cylinder axis directly adjacent to the cylinder or the cylinder liner and opens in a scattered fashion radially directly in front of the intake slots in order to guide a large part of the combustion gases directly into the cylinder.

In order to further improve the effect of the residual gas on the nitrogen oxide emissions, it is advantageous when the exhaust gas recirculation conduit is enclosed at least in sections by a coolant jacket. Moreover, a fire in the intake collector by flashback (airbox firing) can be prevented. For the purpose of additional cooling it may be provided that an injection device for a coolant (preferably water) opens into the exhaust gas recirculation conduit, which additionally has an emission-reducing effect.

BRIEF DESCRIPTION OF THE DRAWINGS

The invention is now explained in closer detail by reference to the enclosed figures, wherein.

DETAILED DESCRIPTION OF THE PREFERRED EMBODIMENTS

Figure 1:
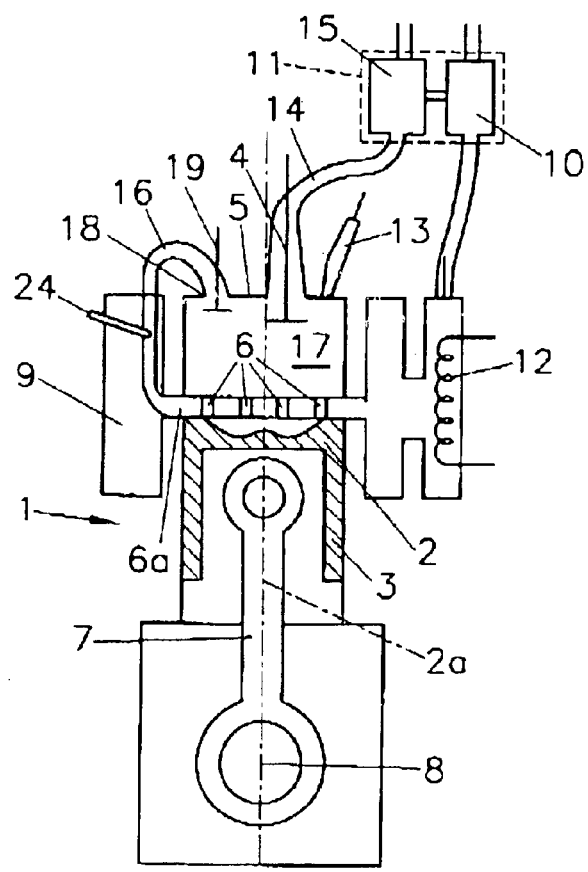
FIG. 1 shows an internal combustion engine in accordance with the invention in a longitudinal sectional view through a cylinder.

The internal combustion engine 1 comprises several cylinders 2 with one reciprocating piston 3 each. Several exhaust valves 4 are arranged in the cylinder head floor 5 of each cylinder 2 and several intake slots 6 are provided in the cylinder wall of the cylinder 2. The intake slots 6 are passed by the control edges of the piston 3. A connecting rod which connects the piston 3 with a crankshaft 8 is designated with reference numeral 7.

The cylinder 2 is encompassed by an intake collector 9 which is connected with the cylinder 2 via the intake slots 6.

The intake air which is compressed by the supercharger wheel 10 of an exhaust gas turbocharger 11 is cooled by the charge cooler 12 and reaches the intake collector 9. Fuel is injected via an injection device 13 into the intake air which is compressed by the piston 3 in the cylinder 2. After the spontaneous ignition the exhaust gases are pushed via the exhaust valve 4 into the exhaust port 14 and reach the outside environment by passing the turbine wheel 15 of the exhaust gas turbocharger 11.

In order to reduce the nitrogen oxide emissions, an exhaust gas recirculation conduit 16 is provided for recirculating the exhaust gases to the cylinder 2. The exhaust gas recirculation conduit 16 starts directly from the combustion chamber 17 which is formed by the cylinder head floor 5 and the piston 3, with an exhaust gas recirculation valve 19 being arranged in the region of the entrance 18 into the exhaust gas recirculation conduit 16, which valve is arranged as a stroke valve. The exhaust gas recirculation conduit 16 leads directly adjacent to the cylinder 2 or the cylinder liner parallel to the cylinder axis 2a to the intake slots 6 and opens into the combustion chamber 17 directly in the region of the intake slots 6. The exhaust gas recirculation conduit 16 does not open into the intake collector 9, but directly before the intake slot 6 into a short intake port 6a between intake collector 9 and intake slot 6, directly upstream into the intake collector 9 or directly into the intake slot 6. The residual gas is pushed into the exhaust gas recirculation conduit 16 during the exhaust cycle when then exhaust gas recirculation valve 19 is opened. At the beginning of the intake period there is a high pressure difference between the exhaust gas recirculation conduit 16 and the combustion chamber 17, as a result of which the residual gas which is upstream of the intake air is sucked into the cylinder 2. As a result, exhaust gas recirculation can be performed even when there are unfavorable conditions between the pressure in the intake collector 9 and the exhaust gas pressure.

Figure 2:
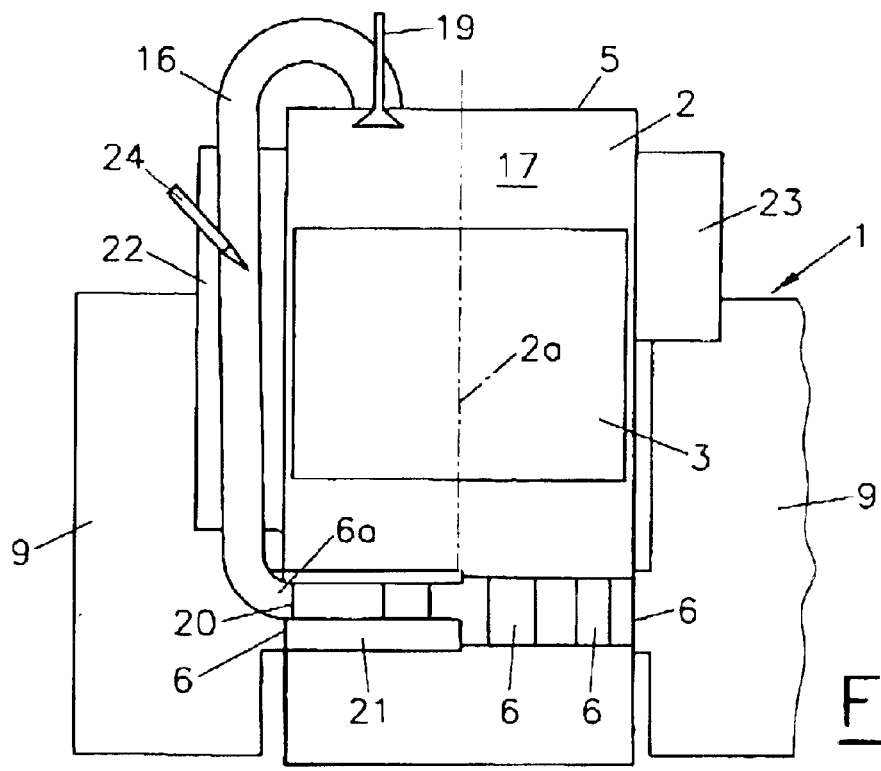
FIG. 2 shows a detail of FIG. 1.
Figure 3:
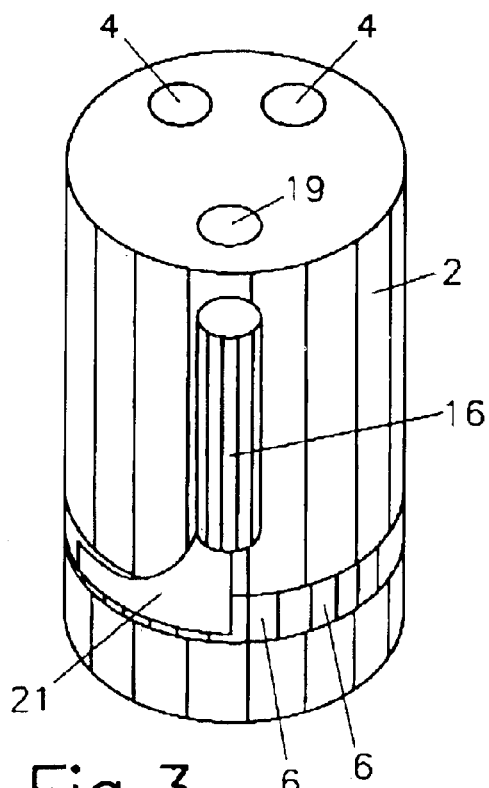
FIG. 3 schematically shows the cylinder of FIGS. 1 and 2 in an oblique view.

As is shown especially in FIGS. 2 and 3, a guide device 21 is provided in the region of the opening 20 of the exhaust gas recirculation conduit 16, which guide device divides the recirculated exhaust gas in a fan-like fashion among several intake slots 6. Higher exhaust gas recirculation rates can thus be achieved and a return flow of the exhaust gas back to the intake collector 9 can be prevented.

Figure 4:
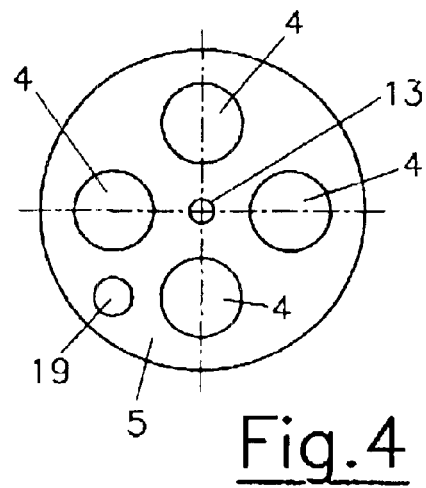
FIG. 4 shows a possible valve arrangement per cylinder.
Figure 5:
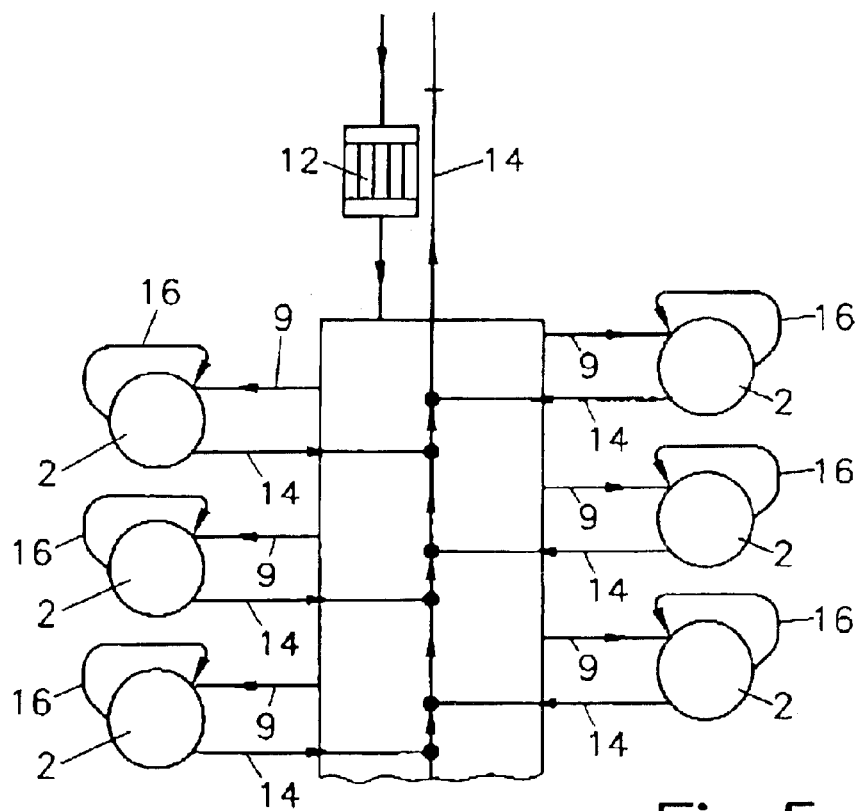
FIG. 5 shows a connection diagram of the internal combustion engine.

FIG. 3 shows a possible arrangement of the exhaust gas recirculation valve 19 and the exhaust valves 4. FIG. 4 shows another arrangement of the exhaust gas recirculation valve 19 and the exhaust valve 4. Any number of exhaust valves 4 which can be practically realized is possible.

In order to prevent the formation of nitrogen oxide, the exhaust gas recirculation conduit 16 is encompassed by a coolant jacket 22 which can be a part of the coolant jacket 23 of the cylinder 2. In order to additionally cool the recirculated exhaust gases, water can be injected into the exhaust gas recirculation conduit 16 via an injection device 24.

Figure 6:
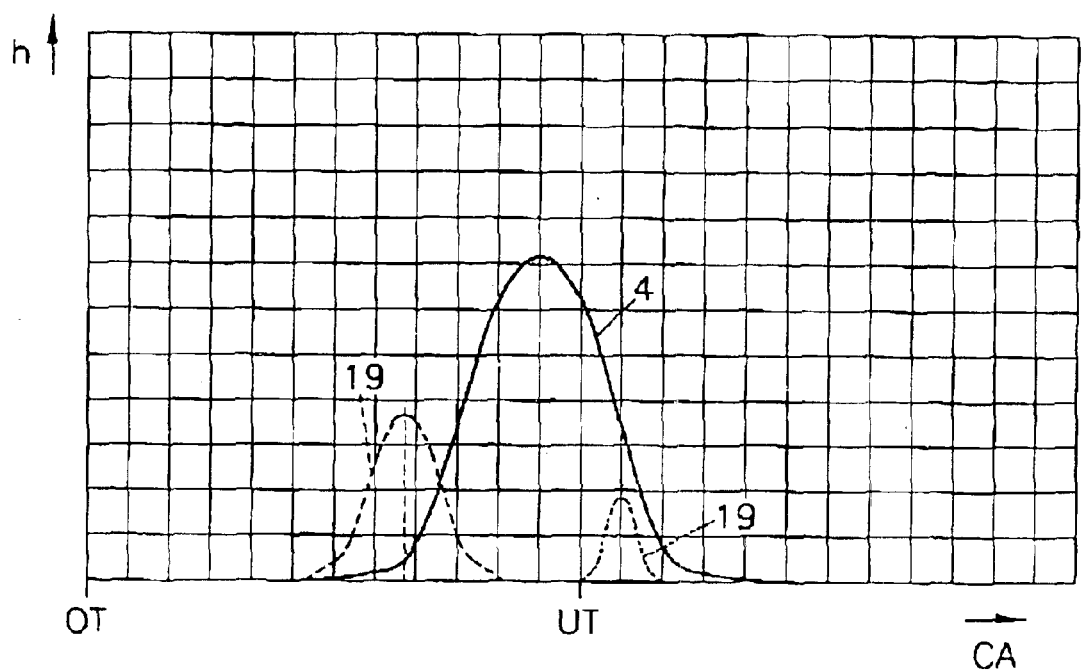
FIG. 6 shows a valve elevation diagram.

FIG. 6 shows the valve lift h for the exhaust valve 4 and for the exhaust gas recirculation valve 19 over the crank angle CA. It can be seen that the opening of the exhaust gas recirculation valve 19 which is configured as a stroke valve occurs primarily at approximately the same time as the opening of the exhaust valve(s) 4 in order to push out a reasonably high mass. If the exhaust gas recirculation valve 19 is opened shortly before the exhaust port 4, especially high exhaust gas recirculation rates can be realized. The closing of the exhaust gas recirculation valve 19 occurs before the opening of the intake slots 6, with a short overlapping being present. The primary opening of the exhaust gas recirculation valve 19 is shown with the broken lines. A further or multiple opening of the exhaust gas recirculation valve 19 can occur in addition. This is shown by way of an example in FIG. 6 by the dotted line.

What is claimed is:

1. A two-stroke internal combustion engine with longitudinal scavenging, with at least one piston reciprocating in a cylinder, with at least one exhaust valve disposed in the cylinder head floor and with at least one intake slot per cylinder which can be passed by a control edge of the piston, with at least one exhaust gas recirculation conduit for the recirculation of exhaust gas into the combustion chamber and at least one exhaust gas recirculation valve for controlling the recirculated exhaust gas quantity, with the exhaust gas recirculation conduit starting out directly from the combustion chamber and the exhaust gas recirculation valve being arranged as a stroke valve which is arranged in the region of the entrance of the exhaust gas recirculation conduit into the cylinder head floor and with the exhaust gas recirculation conduit opening into the cylinder via at least one control slot controlled by the piston, wherein the control slot is the intake slot, wherein at least one exhaust gas recirculation conduit opens into an intake flow path directly upstream of the intake slot, and wherein the intake flow path is an intake port or an intake collector.

2. An internal combustion engine according to claim 1, wherein a guide device is arranged in the region of the opening of the exhaust gas recirculation conduit, which guide device divides the recirculated exhaust gas among several intake slots.

3. An internal combustion engine according to claim 1, wherein the exhaust gas recirculation conduit is arranged directly adjacent to the cylinder.

4. An internal combustion engine according to claim 1, wherein the exhaust gas recirculation conduit is encompassed at least in sections by a coolant jacket.

5. An internal combustion engine according to claim 1, wherein an injection device for a coolant, preferably water, opens into the exhaust gas recirculation conduit.

6. An internal combustion engine according to claim 1, wherein the exhaust gas recirculation valve can be opened by an actuating device approximately simultaneously with the exhaust valve or earlier than the exhaust valve and wherein preferably the exhaust gas recirculation valve can be closed before, simultaneously with or directly after the release of the intake slot.

7. A method for exhaust gas recirculation in a two-stroke internal combustion engine with longitudinal scavenging, with at least one piston reciprocating in a cylinder, with at least one exhaust valve disposed in the cylinder head floor and with at least one intake slot per cylinder which can be passed by a control edge of the piston, with at least one exhaust gas recirculation conduit for the recirculation of exhaust gas into the combustion chamber and at least one exhaust gas recirculation valve for controlling the recirculated exhaust gas quantity, with the exhaust gas recirculation conduit starting out directly from the combustion chamber and the exhaust gas recirculation valve being arranged as a stroke valve which is arranged in the region of the entrance of the exhaust gas recirculation conduit into the cylinder head floor and with the exhaust gas recirculation conduit opening into the cylinder via at least one control slot controlled by the piston, with exhaust gas being taken from the combustion chamber via an exhaust gas recirculation valve during an exhaust period and being re-supplied to the combustion chamber in the next following intake period via an exhaust gas recirculation conduit, wherein the exhaust gas taken directly from the combustion chamber is recirculated directly into the cylinder via at least one intake slot, with the recirculated exhaust gas being upstream of the intake air in the region of the intake slot until the opening of the intake slot by the piston, and wherein the exhaust gas recirculation valve is opened several times during a working cycle.

8. A method according to claim 7, wherein the exhaust gas recirculation valve is opened approximately simultaneously with the exhaust valve or earlier than the exhaust valve, and wherein preferably the exhaust gas recirculation valve can be closed before, simultaneously with or directly after the release of the intake slot.

9. A two-stroke internal combustion engine with longitudinal scavenging, with at least one piston reciprocating in a cylinder, with at least one exhaust valve disposed in the cylinder head floor and with at least one intake slot per cylinder which can be passed by a control edge of the piston, with at least one exhaust gas recirculation conduit for the recirculation of exhaust gas into the combustion chamber and at least one exhaust gas recirculation valve for controlling the recirculated exhaust gas quantity, with the exhaust gas recirculation conduit starting out directly from the combustion chamber and the exhaust gas recirculation valve being arranged as a stroke valve which is arranged in the region of the entrance of the exhaust gas recirculation conduit into the cylinder head floor and with the exhaust gas recirculation conduit opening into the cylinder via at least one control slot controlled by the piston, wherein the control slot is the intake slot, wherein at least one exhaust gas recirculation conduit ends in the region of the intake slot and wherein the intake flow path is an intake port or an intake collector.

10. An internal combustion engine according to claim 9, wherein a guide device is arranged in the region of the opening of the exhaust gas recirculation conduit, which guide device divides the recirculated exhaust gas among several intake slots.

11. An internal combustion engine according to claim 9, wherein the exhaust gas recircuation conduit is arranged directly adjacent to the cylinder.

12. An internal combustion engine according to claim 9, wherein the exhaust gas recirculation conduit is encompassed at least in sections by a coolant jacket.

13. An internal combustion engine according to claim 9, wherein an injection device for a coolant, preferably water, opens into the exhaust gas recirculation conduit.

14. An internal combustion engine according to claim 9, wherein the exhaust gas recirculation valve can be opened by an actuating device approximately simultaneously with the exhaust valve or earlier than the exhaust valve and wherein preferably the exhaust gas recirculation valve can be closed before, simultaneously with or directly after the release of the intake slot.

* * * * *